April 2, 1946. R. C. CASANOV 2,397,469
BATTERY HOLDER
Filed July 16, 1943 3 Sheets-Sheet 1

Inventor:
Raymond C. Casanov
by Clarence E. Thiceedy
his Attorney

April 2, 1946.     R. C. CASANOV     2,397,469
BATTERY HOLDER
Filed July 16, 1943          3 Sheets-Sheet 2

Inventor:
Raymond C. Casanov
by Clarence E. Threedy
his Attorney.

April 2, 1946. R. C. CASANOV 2,397,469
BATTERY HOLDER
Filed July 16, 1943 3 Sheets-Sheet 3
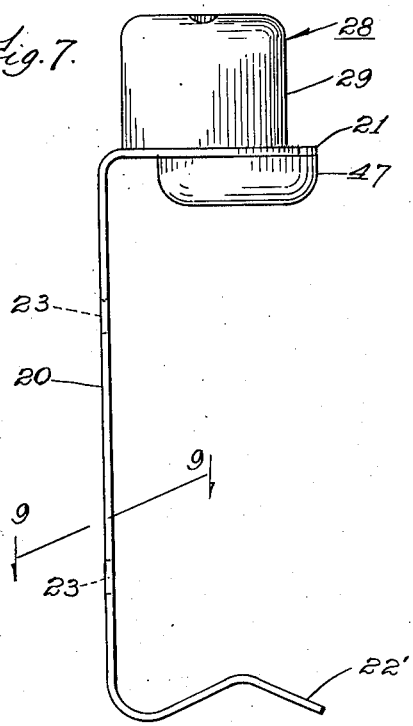
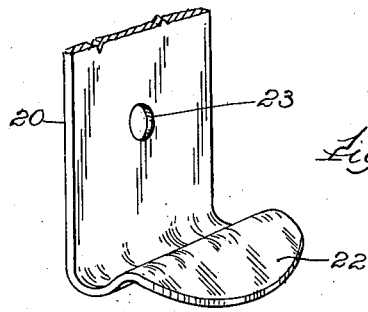
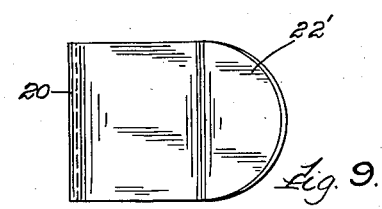
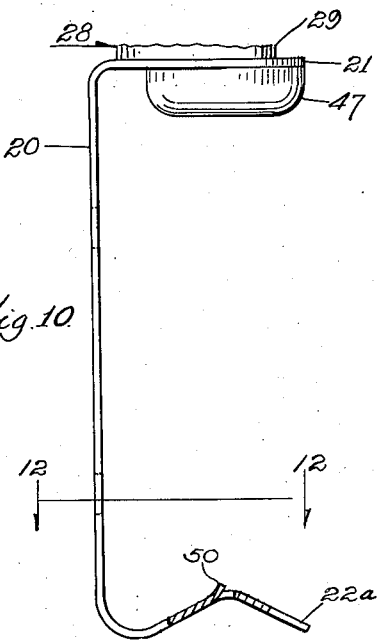
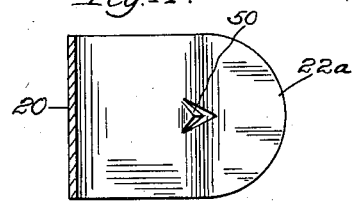
Inventor
Raymond C. Casanov.
by Clarence E. Threedy.
his Attorney.

Patented Apr. 2, 1946

2,397,469

UNITED STATES PATENT OFFICE 2,397,469

BATTERY HOLDER

Raymond C. Casanov, Chicago, Ill.

Application July 16, 1943, Serial No. 494,951

1 Claim. (Cl. 136—173)

This invention relates to certain novel improvements in battery holders, a device especially designed for receiving and securely holding in place a battery of the dry cell type or any other bi-polar or multipolar cell or unit or device, and has for its principal object the provision of an improved construction which will be highly efficient in use and economical in manufacture.

Among the salient objects of my invention is a device for the purposes hereinafter described, having parts arranged with respect to each other as permits of expeditious and convenient assembly of such parts by one other than a mechanic skilled in this art.

A still further object of this invention is to associate with a battery holder of the type hereinafter described, a socket structure whereby, through the medium of a plug, electric connection may be had to supply a source of electric energy to an instrument.

A still further object of the invention is the combination and arrangement of parts hereinafter described which will securely and firmly hold a battery of the dry cell type in position and which parts will function to prevent displacement of such battery due to jars or other shocks transmitted to the holder or battery.

A still further object of the invention is the provision of a battery holder of the type hereinafter described constituting parts which permit easy and expeditious mounting of a battery of the dry cell type within the holder.

Still another object of the invention is a holder for batteries of the dry cell type comprising the fewest parts possible and yet serving in a highly efficient manner for its intended purpose.

Yet another object of the invention is a battery holder of the type hereinafter described which may be adaptable for sundry uses without modification or change.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 7 is a side view of the invention similar to that shown in Figs. 1 to 4 but showing a slightly modified form of construction;

Fig. 8 is a fragmentary sectional detail view taken substantially on line 9—9 of Fig. 7;

Fig. 9 is a bottom plan view of the form shown in Fig. 7;

Fig. 10 is a part sectional detail view similar to that shown in Fig. 7 but illustrating a slightly modified form of construction;

Fig. 11 is a sectional detail view of the form shown in Fig. 10 and taken on line 12—12 of Fig. 10;

Fig. 12 is a sectional detail view similar to Fig. 11 but showing a slightly modified form of construction;

Fig. 13 is a fragmentary sectional detail view taken substantially on line 14—14 of Fig. 12;

Figure 1:
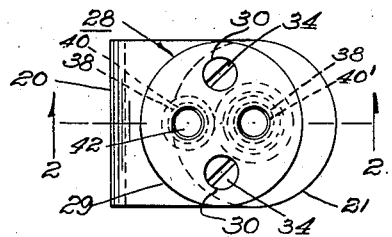
Fig. 1 is a top plan view of the battery holder embodying my invention.
Figure 2:
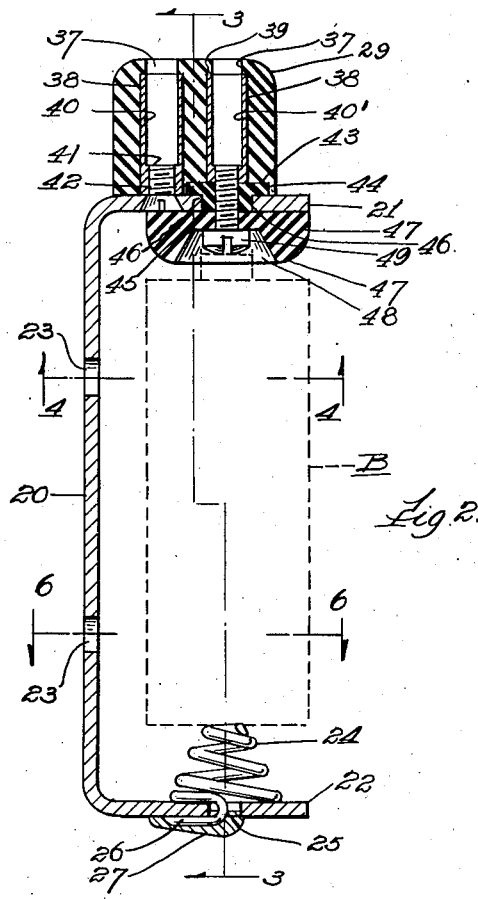
Fig. 2 is a sectional detail view taken substantially on line 2—2 of Fig. 1.

The many objects of my invention are preferably carried into effect by means of the following described construction:

In this respect and referring now more particularly to Figs. 1 to 5 inclusive, my improved battery holder includes a main supporting bracket 20. This bracket 20 is preferably formed from a ribbon-like strip of material and is bent substantially U-shaped to provide oppositely disposed supporting arms or limbs 21 and 22. The bight portion of the bracket 20 may be perforated as at 23 for the passage of attaching elements, such as screws or bolts or the like, whereby the bracket may be attached to a fixed support.

The arm 22 carries a substantially conically shaped expansion spring 24. In the form shown in Fig. 2, one end 25 of this spring is payed through an opening 26 and then securely fixed to the underside of the arm 22 by means of solder 27 or the like.

Mounted upon the arm 21 is a socket structure 28. This socket structure comprises a block 29 formed of suitable insulating material. Formed in the upper portion of this block 29 are openings 30 terminating into openings 31 of a less diameter than the openings 30. Projected through the openings 31 are the shanks 32 of screw elements 33 having their heads 34 positioned in the openings 30. The threaded end portions 35 of these shanks 32 are threaded into tapped openings 36 formed in the arm 21.

Formed also in the block 29 are opposite openings 37 terminating into openings 38 of a slightly greater diameter than the openings 37, whereby to provide shoulders 39 for reasons hereinafter more apparent.

Mounted in the openings 38 are conductor sleeves 40 and 40', the upper ends of which engage the shoulders 39 to limit their outward projection. These sleeves at their respective bottoms have reduced openings 41 formed therein, and in one of these reduced openings 41 is threaded an attaching screw 42. Formed in the block 29 in alignment with the opening 38 into which the sleeve 40' is mounted, is a recess 43 and mounted in this recess is an insulating washer 44, the sleeve 40' bearing upon this washer 44. This washer has a reduced collar 45 formed thereon which fits into an opening 46 formed in the arm 21.

The openings 37 and 38 and their respective conductor sleeves 40 and 40' may be of different diameters so that the positive pole or plug can only be placed in the positive pole of the socket.

A cap is indicated at 47, and this cap 47, like the block 29, is formed of suitable insulating material. This cap 47, in the form shown in Figs. 2 and 3, has a frusto-conically shaped socket 48 formed therein. The cap 47 is attached to the sleeve 40' by means of a conductor screw 49 threaded into the sleeve 40', as shown, by projecting the shank thereof through the insulating shoulder and washer 45 and 44 respectively. In this manner the conductor screw 49 is insulated from the bracket 20.

A standard battery of the dry cell type, indicated at "B", includes a center pole which is generally positive, which projects slightly above the top of the battery. The bottom of the battery is exposed for purposes of contact. In assembling the battery in position upon the holder, the exposed bottom of the battery is positioned on the spring 24 and then pressure applied thereto to compress the spring 24 a sufficient distance to allow the center pole to snap into the frusto-conically shaped socket 48, the side walls of which are preferably straight, whereupon, upon release of the pressure upon the battery, the spring 24 will securely urge the center pole of the battery into contact with the conductor screw 49, thereby making it impossible to fall out or be removed by moving the center pole in a vertical direction.

This form of battery holder is adaptable for many uses. For example, it is common practice of one who employs an electric hearing device, to place in his pocket, or in some other convenient place upon his person, a battery of the dry cell type which supplies current to the hearing device. These batteries have formed, as an integral part thereof, a socket. Consequently, when the battery is exhausted, the same is discarded, and discarded with the battery is this socket. Furthermore, in order to replace this battery for the hearing device, the battery must usually be bought at a place dealing in such devices. Consequently, if a place of purchase is not available, considerable time may be lost in obtaining a suitable battery.

By using my battery holder in connection with a hearing device, it is manifest that the standard dry cell type battery may be used in place of the special battery. It is common knowledge that this dry cell type battery may be purchased in drug stores, hardware stores, and many other places other than electrical stores. Also, it is obvious that when the dry cell type battery is exhausted, only the battery itself is discarded. The socket in my device is a permanent part of the battery holder.

These and many other advantages will be appreciated from the foregoing description of my invention, and while I have recited one use of my battery holder, it is to be understood that I do not want to be limited to that use.

Figure 6:
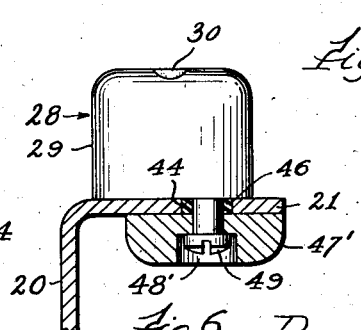
Fig. 6 is a fragmentary sectional detail view of the form shown in Fig. 2 showing a slightly modified form of construction.

In Fig. 6, I have shown a slightly modified form of construction of the cap 47. In this particular instance, instead of providing a conically shaped socket 48, the socket of the cap 47' indicated at 48' is a cylindrical bore of a depth sufficient to receive the center pole of the battery so that the cap may hold the battery with the cooperation of the spring 24 or prong 50 in a firm position. Otherwise, this form of construction is substantially the same as that shown in Figs. 1 to 5 inclusive.

Figure 3:
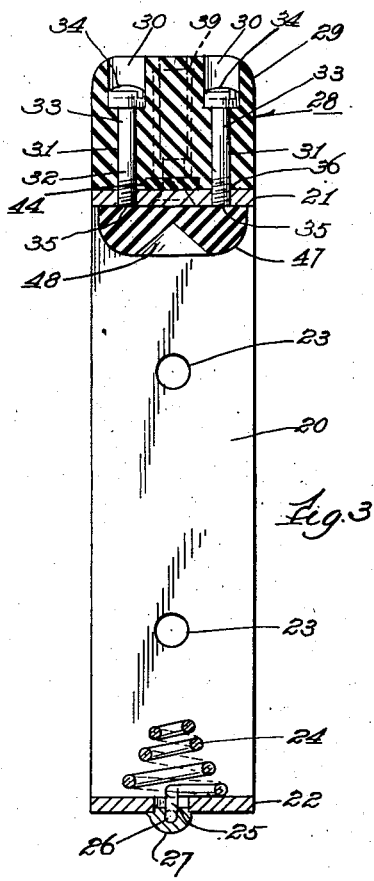
Fig. 3 is a sectional detail view taken substantially on line 3—3 of Fig. 2.
Figure 4:
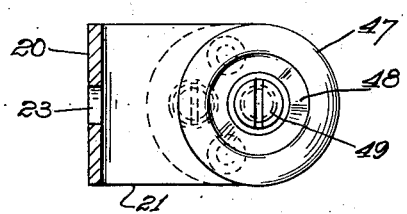
Fig. 4 is a sectional detail view taken substantially on line 4—4 of Fig. 2.

In the form shown in Figs. 7, 8 and 9, I have dispensed with the expansion spring 24 as shown in Fig. 3 and in lieu thereof I have so shaped the arm 22' as to function as a spring means whereby the same result is obtained as though a spring similar to spring 24 were employed.

In the form shown in Figs. 10 and 13 inclusive I have provided a prong 50. This prong is preferably formed in the arm 22a by striking the same from the body thereof, and the purpose of this form is to grip the bottom of the battery so as to assure a firm and complete grip thereto. In Fig. 11 the prong 50 is shown substantially V-shaped; whereas in Figs. 12 and 13 the prong 50, indicated at 50', is round.

Figure 14:
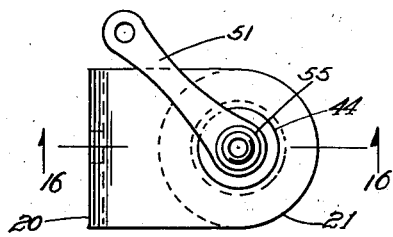
Fig. 14 is a top plan view of the form shown in Fig. 15.
Figure 15:
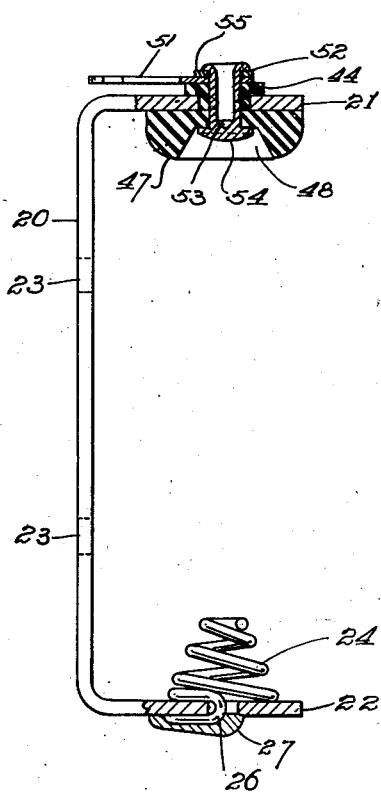
Fig. 15 is a part sectional detail view of a modified form of construction over that shown in Figs. 7 and 10.
Figure 16:
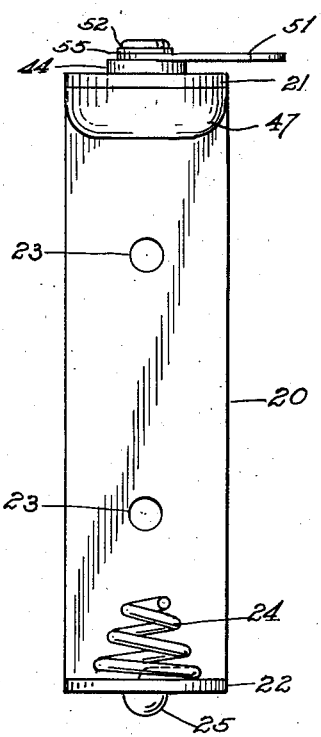
Fig. 16 is a front plan view of the same.
Figure 5:
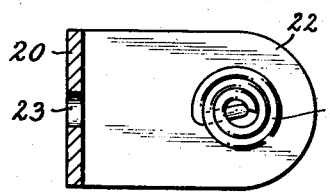
Fig. 5 is a sectional detail view of the same taken substantially on line 6—6 of Fig. 2.

As a modified form of construction over that shown in Figs. 1 to 5 inclusive, I provide the form of battery holder shown in Figs. 14 to 16 inclusive. In this form of construction I have eliminated the socket 28 and substituted in lieu thereof what is known in the electrical art as a clip or conductor tail or soldering lug 51. In this form of construction the tail 51 is mounted between a metallic washer 52 and the insulating washer 44. The conductor clip or tail 51 is secured to the cap 47 through the medium of a hollow rivet 53 having a head 54 at one end thereof which engages the center pole of the battery. The opposite end of the rivet is swaged over as at 55 to provide a firm connection between the conductor clip or tail 51 and the rivet 53. Otherwise, this form of construction is substantially similar to that shown in Figs. 1 to 5.

From the foregoing description, it will be seen that I provide a battery holder which is simple in structure, one in which the battery may be mounted with the least exertion upon the part of the operator, and when mounted the battery will be held firmly in position. When the battery is exhausted, it may be readily removed, discarded, and a new battery substituted therefor. In discarding the exhausted battery, it is manifest that only the battery is discarded. Many other uses will result from my improved battery holder.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A battery holder comprising a bracket formed from a single length of material and bent substantially U-shaped to provide at opposite ends spaced parallel supporting arms between which a battery is adapted to be mounted, one of said arms being provided with an opening, a non-conductive collar disposed in said opening, an electric plug socket secured to one of said arms and located on one side thereof and including a conductor screw passing through said opening, a battery pole receiving cap formed of non-conductive material positioned on the opposite side of said arm and connected to said arm by said conductor screw and having a socket formed therein for the reception of the head of said conductor screw and one pole of said battery, and spring means carried by the other of said arms and providing a seat for the battery and adapted to bear against the battery to force said pole against the head of said screw within said socket.

RAYMOND C. CASANOV.